US007043434B2

(12) United States Patent
Shieh

(10) Patent No.: US 7,043,434 B2
(45) Date of Patent: May 9, 2006

(54) INTEGRATED SPEECH SYNTHESIZER WITH AN AUTOMATIC IDENTIFICATION OF SPEAKER CONNECTIONS AND IDENTIFICATION METHOD USED THEREOF

(75) Inventor: Wuu-Trong Shieh, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 792 days.

(21) Appl. No.: 10/006,124

(22) Filed: Dec. 10, 2001

(65) Prior Publication Data

US 2002/0077818 A1 Jun. 20, 2002

(30) Foreign Application Priority Data

Dec. 20, 2000 (TW) .............................. 89127459 A

(51) Int. Cl.

| | |
|---|---|
| ***G10L 21/00*** | (2006.01) |
| ***G10L 13/00*** | (2006.01) |
| ***H04R 3/00*** | (2006.01) |
| ***G06F 13/12*** | (2006.01) |
| ***G06F 17/00*** | (2006.01) |

(52) U.S. Cl. ...................... 704/270; 704/258; 381/111; 710/69; 700/94

(58) Field of Classification Search ................ 704/258; 381/111, 96; 330/251, 255; 710/69; 700/94
See application file for complete search history.

(56) References Cited

U.S. PATENT DOCUMENTS 5,382,915 A * 1/1995 Muri et al. ................... 330/10
5,450,624 A * 9/1995 Porambo et al. ......... 455/226.4
5,532,649 A * 7/1996 Sahyoun ..................... 330/297
5,592,559 A * 1/1997 Takahashi et al. .......... 381/111
5,815,584 A * 9/1998 Whitecar et al. ............. 381/86
6,859,538 B1 * 2/2005 Voltz ........................... 381/77

OTHER PUBLICATIONS

Preliminary W583XXX. Datasheet [online]. Winbond Electronics Corporation, Mar. 1999. URL: http://www-.datasheetarchive.com/semiconductors/download.php-?Datasheet=2216164.*

RSC-200/264T. Datasheet [online]. Sensory Inc., 1999. URL: http://www.sensoryinc.com/html/support/docs/80-0111.pdf.*

(Continued)

*Primary Examiner*—Susan McFadden
*Assistant Examiner*—Brian L. Albertalli
(74) *Attorney, Agent, or Firm*—Rosenberg, Klein & Lee

(57) ABSTRACT

An integrated speech synthesizer with an automatic identification of speaker connections and identification method includes a sound encode register to store encoded digitized sound data, a first digital to analog converter unit connected to the sound encode register to convert the digitized sound data from the sound encode register to a first analog signal and send out the first analog signal from a first output terminal, a second digital to analog converter unit connected to the sound encode register to convert the digitized sound data from the first output terminal to a second analog signal and send out the second analog signal from the first output terminal and a second output terminal, and a state register connected to the first output terminal to store the state of the first output terminal before the speech synthesizer is enabled. The state stored in the state register is used to set up the initial value and other related settings for the speech synthesizer.

10 Claims, 6 Drawing Sheets

OTHER PUBLICATIONS

Voice Dialer Speech Recognition Dialing IC. Datasheet [online]. Sensory Inc., 1996. URL: http://www.sensoryinc-.com/html/support/docs/80-0085.pdf.*

SPC81A. Datasheet [online]. Sunplus, Sep. 15, 1999. URL: http://211.72.231.168/download.asp?dtype=ds&body=SPC81A.*

* cited by examiner

INTEGRATED SPEECH SYNTHESIZER WITH AN AUTOMATIC IDENTIFICATION OF SPEAKER CONNECTIONS AND IDENTIFICATION METHOD USED THEREOF

FIELD OF THE INVENTION

The present invention relates generally to an integrated speech synthesizer, and more particularly, to an integrated speech synthesizer with an automatic identification of speaker connections to determine an initial value thereof and identification method used thereof.

BACKGROUND OF THE INVENTION

The speech synthesizer is used to convert digitized sound information to analog signal and output to a speaker to regenerate the sound. FIG. 1A shows a waveform of a period of sound and the digitized range of the wave. When digitally encoded with 7-bits pulse code modulation (PCM), it normally uses 40H as the central point, and the speech signal varies up and down around the central point, that is varies in-between 00H and 7FH.

FIG. 2 shows a functional block diagram of a conventional PCM speech synthesizer connected with a speaker, in which the PCM codes are stored in the PCM encode register 22. When the speech synthesizer 20 is enabled and start to operation, the PCM codes that stored in the PCM encode register 22 are sent out to the digital to analog converter unit 24 in order. The digital to analog converter unit 24 converts the received PCM codes to an analog signal and then sends to the output terminal VO. The current from the output terminal VO is amplified by a transistor 26 to drive the speaker 50 to produce sounds. To save the power during the speech synthesizer 20 is turned off, there shouldn't be any current from the output terminal VO, therefore the initial value of the PCM encode register 22 is 00H. As shown in FIG. 1B, when the speech synthesizer 20 is enabled, PCM codes are sent to the digital to analog converter unit 24, and the value changed from 00H to 40H, that makes an large instant current change on the output terminal VO and thus produces burst noises. On the other hand, when the operation of the speech synthesizer 20 stops, PCM code changes from 40H to 00H, that also makes an large instant current change on the output terminal VO and produces burst noises. For improvement, it always adds a rising wave and a falling wave before and after the sound data respectively to avoid the large instant current change and burst noises, as shown in FIG. 1C.

Another type of speech synthesizer that drives the speaker directly, for example the push-pull drive type, is shown in FIG. 3, which processes with pulse width modulation (PWM). The PWM speech synthesizer 30 includes a PWM encode register 32 and a digital to analog converter unit 34. The digital to analog converter unit 34 has two output pins and sends out signal with push-pull type to drive the speaker 50 directly. The speech synthesizer 30 uses 40H as the zero point of the speech signal, thereby the initial value is 40H before the speech synthesizer 30 is enabled. In such circumstances, both the initial value and the central point of the speech signal are 40H, it is therefore not necessary to add a rising wave and a falling wave before and after the sound data.

However, when it is intended to integrate the PCM type with the direct drive type speech synthesizers, it is necessary to provide a mechanism to decide which type of speech synthesis unit to be enabled since the speaker connection and the initial value are different for them. Typically, there are two methods to provide needed information. The first one is to provide an input pin for selection. However it needs more chip area, and it requests the user to control the state of the input pin. When the input pin is not under good control, the speech synthesizer can not function correctly, thus it is inconvenient for applications. The second method is to select by mask (in the encoding layer or metal layer). Once the chip is fabricated, it is impossible to change the speaker connection and thus has less flexibility.

SUMMARY OF THE INVENTION

To solve problems described in the above, an object of the present invention is a speech synthesizer with integrated PCM type and direct drive type, which is enable to automatically identify the speaker connection and set up initial value and related parameters.

According to the present invention, an integrated speech synthesizer with an automatic identification of speaker connections comprises an encode register for storage of encoded digital data of sound, a first digital to analog converter unit connected to the encode register to convert the digitized sound data from the output terminal of the encode register to a first analog signal and send out the first analog signal through a first output terminal, a second digital to analog converter unit connected to the encode register to convert the digitized sound data from the output terminal of the encode register to a second analog signal and send out the second analog signal through the first output terminal and a second output terminal, and a state register connected to the first output terminal to store the state of the first output terminal before the speech synthesizer is enabled, wherein the initial value and related parameters for the speech synthesizer is set up in reference to the state stored in the state register.

A method, according to the present invention, for automatic identification of speaker connections for an integrated speech synthesizer that includes a digital to analog converter unit to output a first analog signal through a first output terminal and a direct drive type digital to analog converter unit to output a second analog signal through the first output terminal and a second output terminal comprises:

1. sending out a preset voltage from the second output terminal;
2. storing the state of the first output terminal in a state register before the speech synthesizer is enabled; and
3. setting up the initial value and related parameters for the speech synthesizer in reference to the state stored in the state register.

Due to the state of the first output terminal stored in a state register for the different speaker connections before the speech synthesizer is enabled and the control of setting up the initial values for different units in reference to the state stored in the state register, the integrated speech synthesizer according to the present invent is convenient and flexible for uses. Moreover, the cost is reduced since no additional pin is needed.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION OF THE INVENTION

Figure 1A:
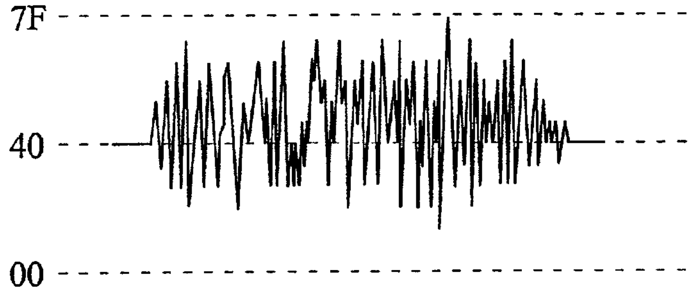
FIG. 1 shows a waveform of a period of sound and the digitized range of the wave.
Figure 1B:
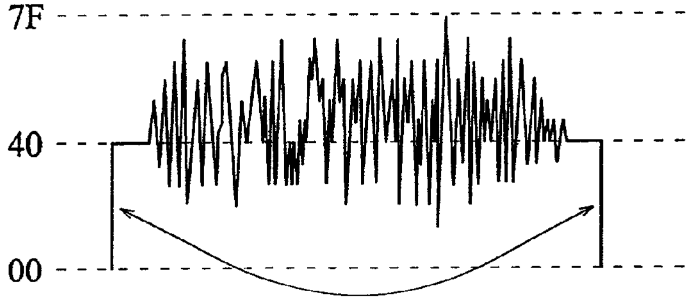
Figure 1C:
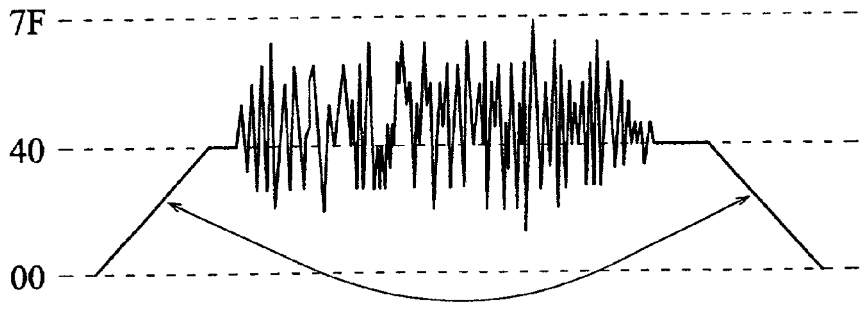
Figure 2:
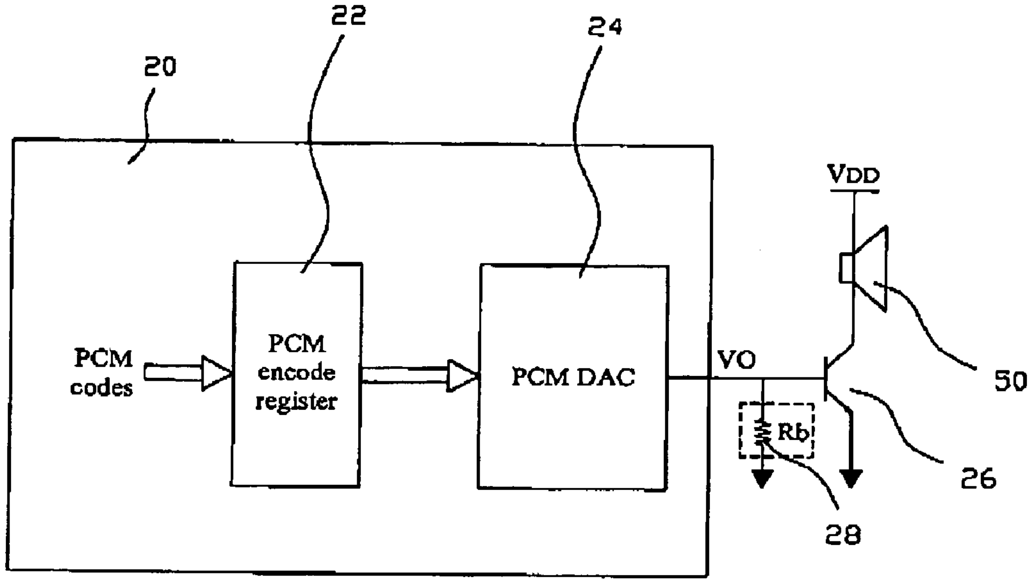
Fig. 2 (Prior art)
FIG. 2 is a functional block diagram of a conventional PCM speech synthesizer connected with a speaker.
Figure 3:
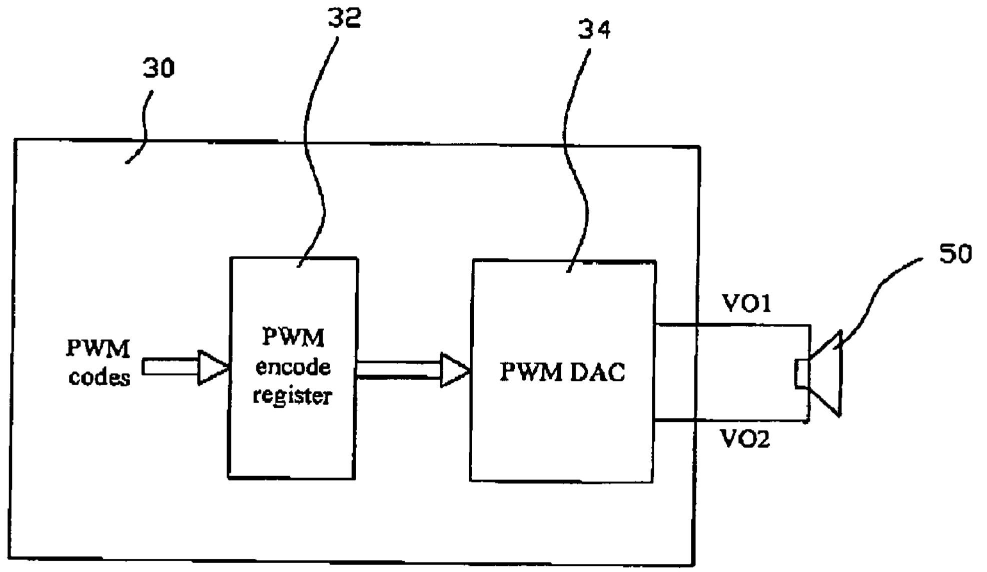
Fig. 3 (Prior art)
FIG. 3 is a functional block diagram of a conventional PWM speech synthesizer connected with a speaker.
Figure 4:
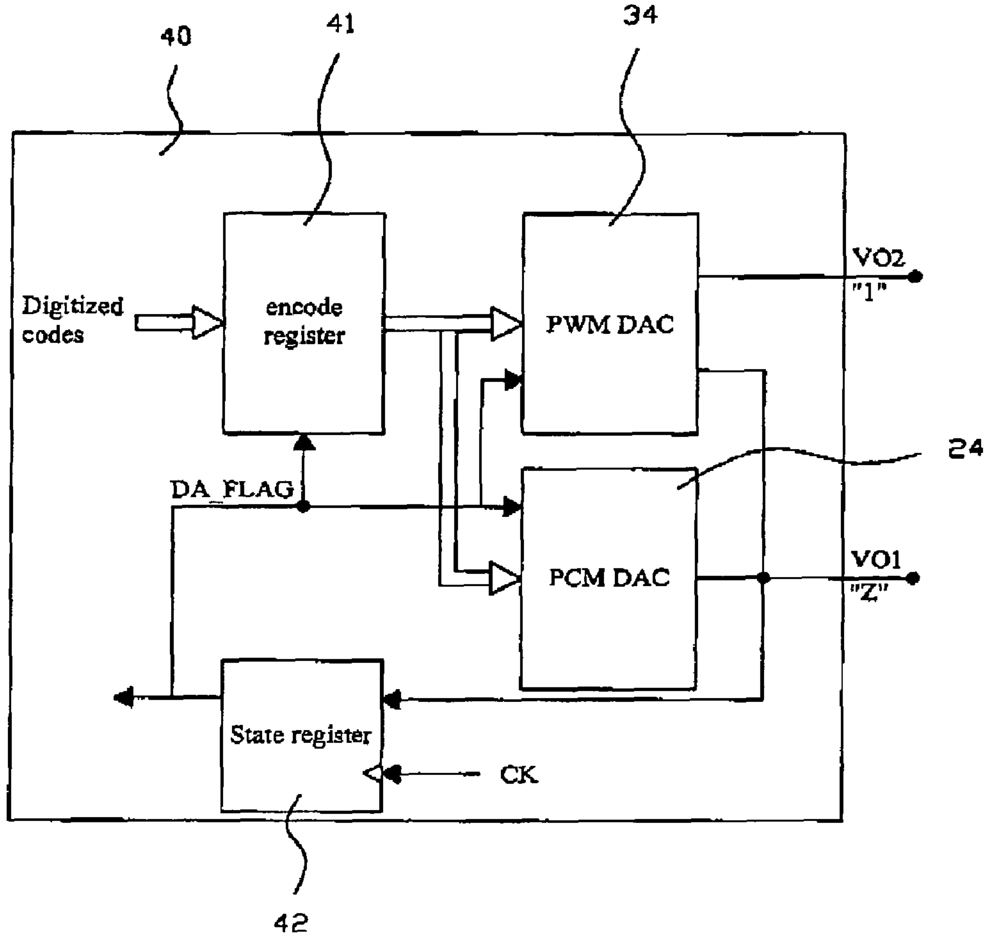
FIG. 4 is a functional block diagram of an integrated speech synthesizer with an automatic identification of speaker connections according to the present invention.

A functional block diagram of an integrated speech synthesizer with an automatic identification of speaker connections according to the present invention is shown in FIG. 4, in which an integrated speech synthesizer 40 comprises an encode register 41, a digital to analog converter unit 24, a digital to analog converter unit 34, and a state register 42. The encode register 41 is provided to store the digitized codes of sound wave. The input of the digital to analog converter unit 24 is connected to the encode register 41 to convert the digitized codes from the encode register 41 to an analog signal, and send out the current of the analog signal through a first output terminal VO1. The digital to analog converter unit 34 is also connected to the encode register 41 to convert the digitized codes from the encode register 41 to an analog signal and send out the current of the analog signal with push-pull type through the first output terminal VO1 and a second output terminal VO2. The first output terminal VO1 is set to high impedance before the speech synthesizer 40 is enabled.

On the other hand, the input of the state register 42 is connected to the first output terminal VO1 to latch the state of the first output terminal VO1 by use of a pulse signal CK to identify the speaker connections before the speech synthesizer 40 is enabled. The output terminal of the state register 42 is connected to the encode register 41, digital to analog converter unit 24, digital to analog converter unit 34 and other units (not shown), if needed, to provide the state for the initial value set up and for control and setting of other related units.

Figure 5:
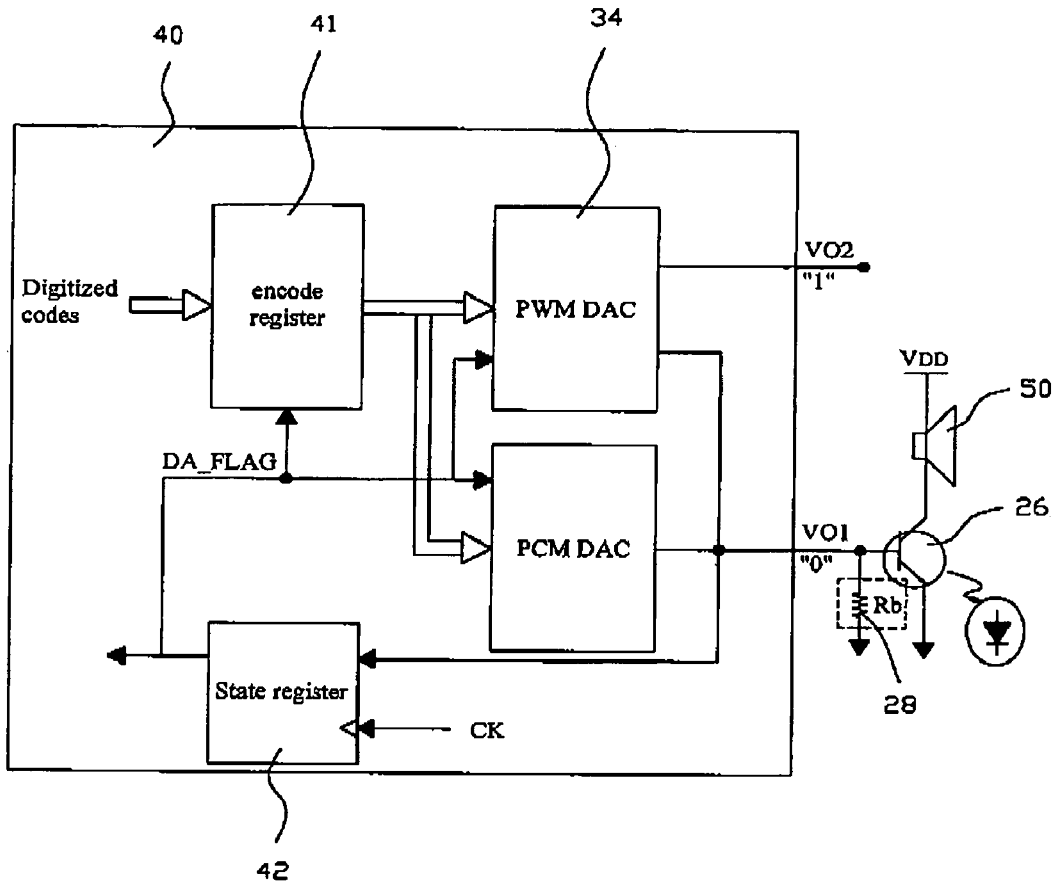
FIG. 5 is a functional block diagram to show when the first output terminal of the integrated speech synthesizer shown in FIG. 4 is connected to a speaker.
Figure 6:
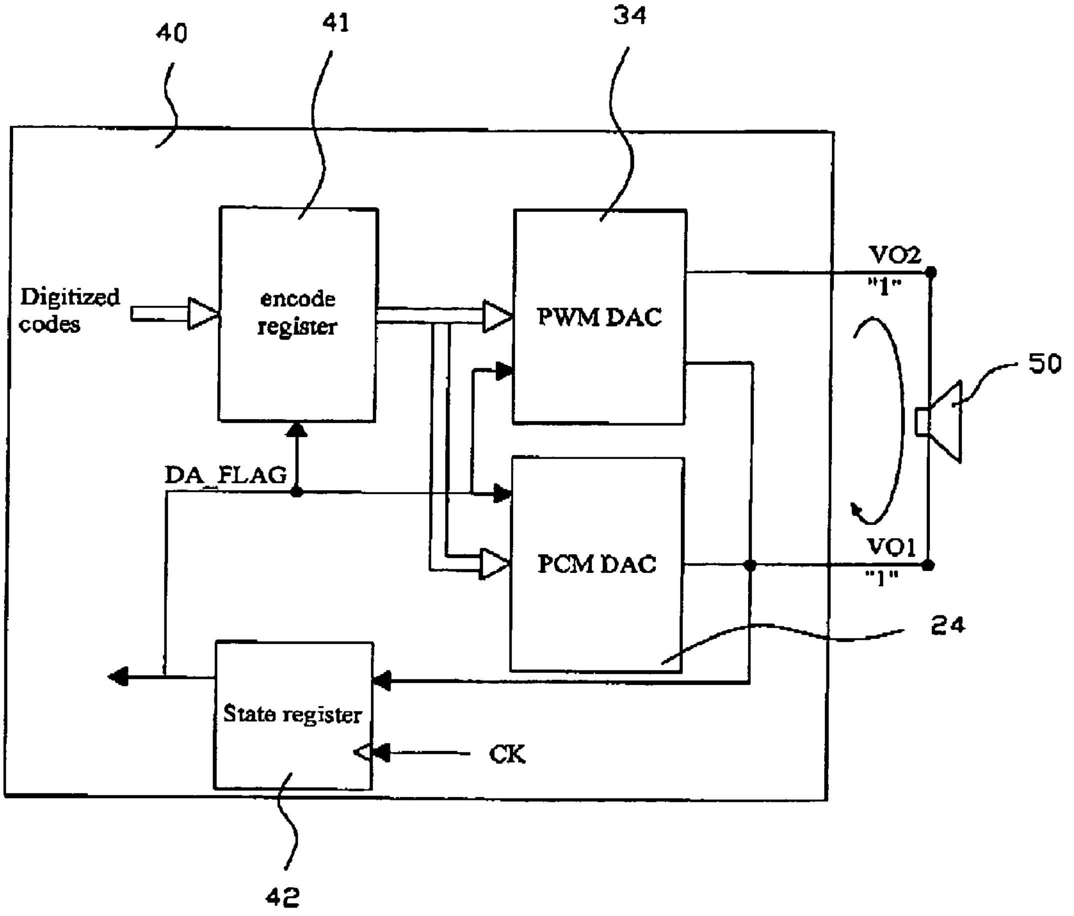
FIG. 6 is a functional block diagram to show when the first and second output terminals of the integrated speech synthesizer shown in FIG. 4 are connected to a speaker.

FIGS. 5 and 6 illustrate the theory of automatic identification of speaker connections according to the present invention.

FIG. 5 shows the state that a speaker is connected to the first output terminal of the integrated speech synthesizer through a transistor, in which one terminal of the speaker 50 is connected to a power supply, the other terminal is connected to the collector of an NPN transistor 26 that has its emitter grounded and base connected to the first output terminal VO1. One terminal of a bypass resister 28 is grounded and the other terminal is connected to the first output terminal VO1. With such connection and before the digital to analog converter units 24 and 34 are enabled, the first output terminal VO1 is in a high impedance “Z” state, and there is a P-N junction equivalent diode when seen from the first output terminal VO1 to the NPN transistor 26, thus the voltage of the first output terminal VO1 is pulled down to low level “0” by the equivalent diode or by the bypass resistor 28.

FIG. 6 shows the state that the speaker is directly connected to the first and second output terminals of the integrated speech synthesizer, in which one terminal of the speaker 50 is connected to the first output terminal VO1 and the other terminal is connected to the second output terminal VO2. With such connection and before the digital to analog converter units 24 and 34 are enabled, when a high voltage is supplied to the second output terminal VO2, the voltage on the first output terminal VO1 is pulled up to high level “1” by the speaker 50, as the resistance of the speaker 50 is about 4–64Ω and the first output terminal VO1 is in a high impedance “Z” state.

According to the results concluded in the above paragraphs, different speaker connections cause different voltage states on the first output terminal VO1, that is a high voltage “1” and a low voltage “0”. After the speaker 50 is connected to the speech synthesizer 40 and before the speech synthesizer 40 is enabled, a high voltage is sent to the second output terminal VO2 and the state register 42 stores the state of the first output terminal VO1 in advance, then the connection of the speaker 50 is identified in reference to the state stored in the state register 42 to enable the related speech synthesis unit. For example, when the speaker 50 is connected in the manner shown in FIG. 5 the state in the state register 42 is “0”, and when the speaker 50 is connected in the manner shown in FIG. 6 the state in state register 42 is “1”. As a result, the state register 42 can send the state value DA_FLAG to the encode register 41, digital to analog converter unit 24, digital to analog converter unit 34 and other units (not shown) to indicate the connection state of the speaker 50 for the control parameters and setting. For example, when the state value DA_FLAG is “0”, the digital to analog converter unit 24 can be enabled and sets up the initial value to 00H, thereby adding a rising wave and a falling wave before and after the encoded sound data respectively. When the state value DA_FLAG is “1”, the digital to analog converter unit 34 can be enabled and sets up the initial value to 40H.

While the present invention has been described in conjunction with preferred embodiments thereof, it is evident that many alternatives, modifications and variations will be apparent to those skilled in the art. For example, in the above embodiment the PWM is used in conjunction with the second digital to analog converter unit, however, other speech synthesis unit devices with direct drive function can also be applied. Accordingly, it is intended to embrace all such alternatives, modifications and variations that fall within the spirit and scope thereof as set forth in the appended claims.

What is claimed is:

1. An integrated speech synthesizer with an automatic identification of speaker connections comprising:

a sound encode register for storing encoded digitized sound data;

a first digital to analog converter unit connected to said sound encode register for converting said digitized sound data from said sound encode register to a first analog signal and sending out said first analog signal through a first output terminal;

a second digital to analog converter unit connected to said sound encode register for converting said digitized sound data from said sound encode register to a second analog signal and sending out said second analog signal through a second output terminal and said first output terminal; and a state register connected to said first output terminal for detecting and storing a connection state of said first output terminal before said speech synthesizer is enabled, said state register having an output coupled to said sound encode register, said first digital to analog converter unit and said second digital to analog converter unit to thereby automatically set up an initial value for said first and second digital to analog converters.

2. An integrated speech synthesizer according to claim 1 wherein said state register detects said first output terminal in a high impedance state before said speech synthesizer is enabled responsive to a speaker being coupled between said first and second output terminals.

3. An integrated speech synthesizer according to claim 1 wherein said state register detects said first output terminal in a low level before said speech synthesizer is enabled responsive to a drive circuit for a speaker being connected to said first output terminal.

4. An integrated speech synthesizer according to claim 1 wherein said second digital to analog converter unit is a direct drive type speech synthesis unit.

5. An integrated speech synthesizer according to claim 4 wherein said second digital to analog converter unit is a push-pull type digital to analog converter unit.

6. An integrated speech synthesizer according to claim 1 wherein said second output terminal is in a high level before said speech synthesizer is enabled.

7. A method for automatic identification of speaker connections to an integrated speech synthesizer with a pair of digital to analog converter units, a first of said pair of digital to analog converter units sending out a first analog signal from a first output terminal, a second of said pair of digital to analog converter sending out a second analog signal from a second output terminal and said first output terminal, said method comprising:

setting said first output terminal to a high impedance state prior to input of digital speech signals to said pair of digital to analog converter units;

sending out a preset voltage from said second output terminal;

detecting and storing a state of said first output terminal with a state register having an input coupled thereto, the detection and storing step occurring prior to said input of the digital speech signals; and setting an initial value input to said pair of digital to analog converter units responsive to said detected state stored in said state register.

8. A method according to claim 7 wherein said preset voltage is high.

9. A method according to claim 7 wherein the step of detecting and storing includes the step of setting a flag to indicate a drive circuit for a speaker is connected to only said first output terminal responsive to a low level being detected at said first output terminal prior to said input of digital speech signals.

10. A method according to claim 7 wherein the step of detecting and storing includes the step of setting a flag to indicate a speaker is connected to said first and second output terminals responsive to a high level being detected at said first output terminal prior to said input of digital speech signals.

* * * * *